United States Patent [19]
Kondo et al.

[11] Patent Number: 5,274,458
[45] Date of Patent: Dec. 28, 1993

[54] VIDEO CAMERA

[75] Inventors: Toshiharu Kondo; Shuji Shimizu; Katsuaki Hirota, all of Kanagawa; Fumiaki Kato, Chiba, all of Japan

[73] Assignee: Sony Corporation, Tokyo, Japan

[21] Appl. No.: 824,227

[22] Filed: Jan. 22, 1992

[30] Foreign Application Priority Data

Jan. 25, 1991 [JP] Japan .................................. 3-025494

[51] Int. Cl.⁵ .......................... H04N 5/30; H04N 5/76
[52] U.S. Cl. ................................ 358/209; 358/335; 358/906
[58] Field of Search .................. 358/41, 43, 44, 209, 358/210, 224, 227, 228, 29, 29 C, 160, 909, 906, 335, 310, 311, 312

[56] References Cited

U.S. PATENT DOCUMENTS

| | | | |
|---|---|---|---|
| 4,858,028 | 8/1989 | Okino | 358/909 |
| 5,043,816 | 8/1991 | Nakano et al. | 358/909 |
| 5,111,299 | 5/1992 | Aoki et al. | 358/909 |
| 5,144,450 | 9/1992 | Kikuchi et al. | 358/227 |
| 5,155,584 | 10/1992 | Taguchi et al. | 358/909 |

Primary Examiner—James J. Groody
Assistant Examiner—Michael H. Lee
Attorney, Agent, or Firm—Lewis H. Eslinger; Jay H. Maioli

[57] ABSTRACT

A switching circuit to selectively generate either one of an image pickup signal from an image pickup device and a reproduction video signal in which when the recording mode is set, the switching circuit is set to the side on which the image pickup signal from the image pickup device is supplied. When the reproducing mode is set, the switching circuit is set to the side on which the reproduction video signal is supplied. When the instantaneous reproduction is executed in the recording mode, the optical information from an optical information detecting circuit just before the switching circuit is switched from the side on which the image pickup signal is supplied to the side on which the reproduction video signal is supplied is held. An output of the switching circuit is converted into a digital signal. The digital signal is supplied to a digital signal processing circuit to process the digital signal and is also supplied to the optical information detecting circuit to detect the optical information.

2 Claims, 3 Drawing Sheets

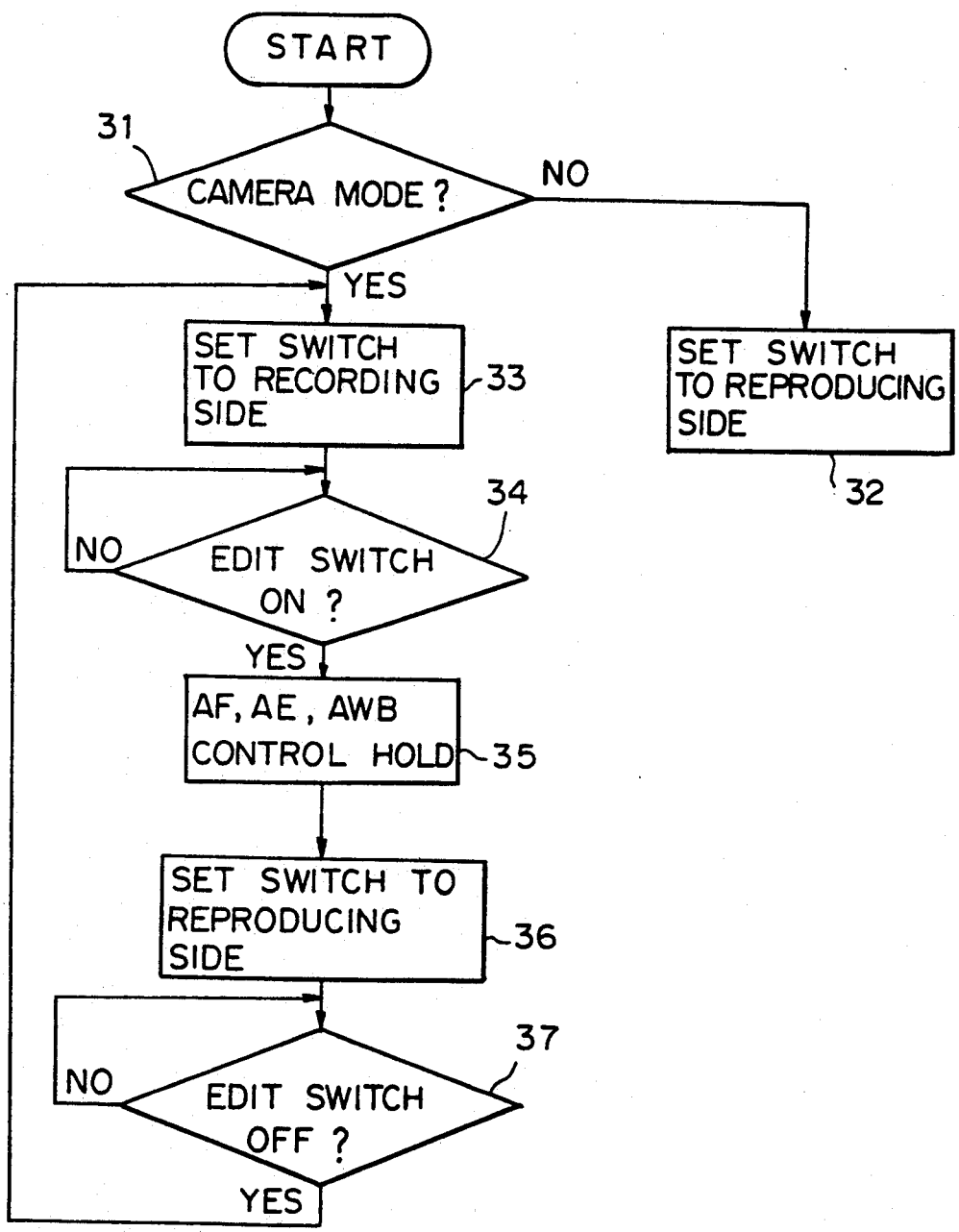

VIDEO CAMERA

BACKGROUND OF THE INVENTION

1. Field of the Invention

The invention relates to a video camera and, more particularly, to a video camera which executes a signal process by a digital circuit.

2. Description of the Prior Art

There has been develop a video camera in which an image pickup signal from a CCD image pickup device is digitized and a signal process is executed by a digital circuit and detection signals to perform a focus control, an exposure control, and a white balance control are obtained by using the digital circuit. In such a video camera, an A/D converter, a digital signal processing circuit, a D/A converter, and the like are commonly used in both of the recording mode and the reproducing mode, thereby enabling the circuit scale and the costs to be reduced.

That is, in FIG. 1, an image pickup signal from the CCD image pickup device is supplied to an input terminal 51. A composite color video signal of, for instance, the NTSC system reproduced from a tape is supplied to an input terminal 52. A signal from the input terminal 51 is supplied to a terminal 53A of a switching circuit 53. A signal from the input terminal 52 is supplied to a terminal 53B of the switching circuit 53.

In the recording mode, the switching circuit 53 is switched to the terminal 53A side. In the reproducing mode, the switching circuit 53 is switched to the terminal 53B side. An output of the switching circuit 53 is supplied to an A/D converter 54. The output of the switching circuit 53 is digitized by the A/D converter 54. An output of the A/D converter 54 is supplied to a digital signal processing circuit 55 and is also supplied to an optical detector 56.

The optical detector 56 forms an AF detection signal for automatic focus control, an AE detection signal for exposure control, and an AWB detection signal for white balance control. The AF detection signal, AE detection signal, and AWB detection signal from the optical detector 56 are supplied to a system controller 57. On the basis of the AF, AE, and AWB detection signals, the system controller 57 controls a lens position, an opening degree of an iris, a gain of an AGC amplifier, and a level of each of the color signals. Due to this, the focus control, exposure control, and white balance control are executed.

The digital signal processing circuit 55 is constructed by a delay circuit, an adding/subtracting circuit and the like. In the recording mode, the image pickup signal from the, CCD image pickup device is supplied to the digital signal processing circuit 55. The digital signal processing circuit 55 forms a luminance signal and a chroma signal from the image pickup signal. The luminance signal and the chroma signal from the digital signal processing circuit 55 are supplied to D/A converters 58 and 59, respectively, and are converted into analog signals. Outputs of the D/A converters 58 and 59 are taken out from output terminals 60 and 61, respectively.

In the reproducing mode, the reproduction composite color video signal is supplied to the digital signal processing circuit 55. Upon reproduction, the digital signal processing circuit 55 operates as a comb filter. The processing circuit 55 separates the composite color video signal into the luminance signal and the chroma signal. The luminance signal and chroma signal from the processing circuit 55 are supplied to the D/A converters 58 and 59, respectively, and are converted into the analog signals. The outputs of the D/A converters 58 and 59 are taken out from output terminals 60 and 61, respectively.

As mentioned above, in the video camera in which the image pickup signal from the CCD image pickup device is digitized and the signal process is executed by the digital circuit, the A/D converter 54, digital signal processing circuit 55, D/A converters 58 and 59, and the like can be commonly used in both of the recording mode and the reproducing mode.

In the construction as shown in FIG. 1, however, there is a problem such that when an edit search (when an edit button is depressed in the camera mode, the camera is set into the reproducing mode for only a period of time of the depression of the edit button) is executed, the optical characteristics of the camera become out of order just after the execution of the edit search.

In other words, in the construction of FIG. 1, the output of the switching circuit 53 is supplied to the optical detector 56 through the A/D converter 54. In the edit search mode, the switching circuit 53 is switched to the terminal 53B side for only a period of time when the edit button is depressed. When the edit button is released, the switching circuit 53 is switched to the terminal 53A side. In the edit search mode, therefore, the reproduction composite color video signal is supplied for only a period of time when the edit button is depressed. When the edit button is released, the image pickup signal from the CCD image pickup device is supplied. When the image pickup signal from the CCD image pickup device is supplied to the optical detector 56, the correct AF, AE, and AWB detection signals are obtained from the optical detector 56. When the reproduction composite color video signal is supplied to the optical detector 56, however, the AF, AE, and AWB detection signals from the optical detector 56 are the meaningless signals. Consequently, the AF, AE, and AWB detection signals from the optical detector 56 have the meaningless values for a period of time of the depression of the edit button. When the edit button is released, the initial values of the AF, AE, and AWB detection signals are out of order.

OBJECTS AND SUMMARY OF THE INVENTION

It is, therefore, an object of the invention to provide a video camera which can prevent the optical characteristics of the camera being out of order just after the edit search.

According to the invention, when an instantaneous reproduction is executed, a state of a camera block is held, thereby preventing that the optical characteristics of the camera just after the edit search are out of order.

The above, and other objects, features and advantages of the present invention will become readily apparent from the following detailed description thereof which is to be read in connection with the accompanying drawings.

BRIEF DESCRIPTION OF THE DRAWINGS

FIG. 3 is a flowchart which is used to explain the embodiment of the invention.

DESCRIPTION OF THE PREFERRED EMBODIMENT

Figure 1:
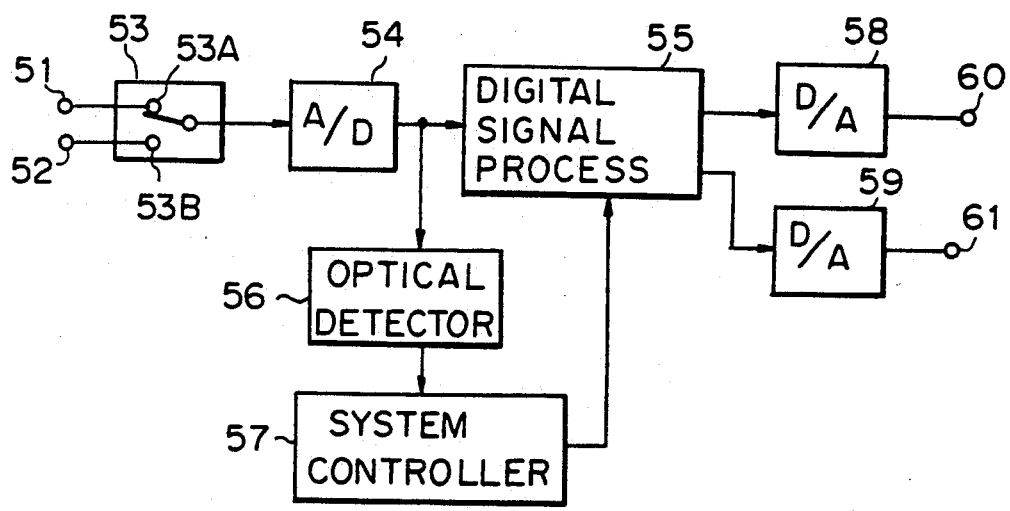
FIG. 1 is a block diagram which is used to explain a conventional video signal processing circuit.
Figure 2:
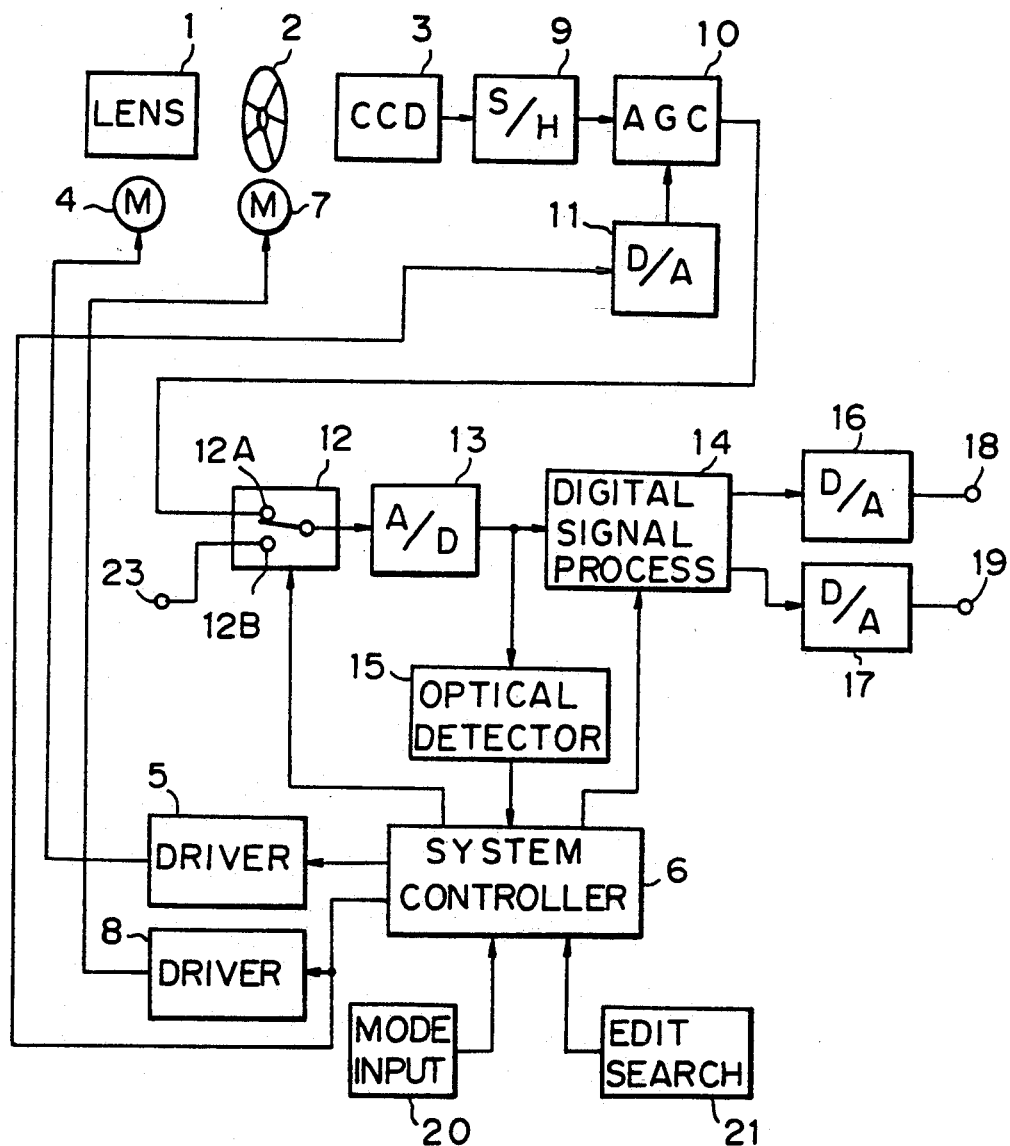
FIG. 2 is a block diagram of an embodiment of the invention.

An embodiment of the invention will be described hereinbelow with reference to the drawings. FIG. 2 shows an embodiment of the invention. In FIG. 2, an object image obtained through a lens 1 is formed onto a photo sensitive surface of a CCD image pickup device 3 through an iris 2. The position of the lens 1 is controlled by a focusing motor 4. A drive signal is supplied from a system controller 6 to the focusing motor 4 through a motor driver 5. The opening/closing operation of the iris 2 is controlled by an iris driving circuit 7. A drive signal is supplied from the system controller 6 to the iris driving circuit 7 through a motor driver 8.

An output of the CCD image pickup device 3 is supplied to a sample and hold (S/H) circuit 9. An output of the S/H circuit 9 is supplied to an AGC amplifier 10. A gain of the AGC amplifier 10 is set in accordance with an output of a D/A converter 11. An output of the AGC amplifier 10 is supplied to a terminal 12A of a switching circuit 12.

A reproduction NTSC composite color video signal is supplied from an input terminal 23 to a terminal 12B of the switching circuit 12. The switching circuit 12 is switched in accordance with the recording mode and the reproducing mode. Either one of the recording and reproducing modes is set by a mode switch 20.

An output of the switching circuit 12 is supplied to an A/D converter 13. An output of the A/D converter 13 is supplied to a digital signal processing circuit 14 and is also supplied to an optical detector 15.

The optical detector 15 forms an AF detection signal for automatic focus control, an AE detection signal for an exposure control, and an AWB detection signal for white balance control. The AF, AE, and AWB detection signals from the optical detector 15 are supplied to the system controller 6. On the basis of the AF detection signal, the system controller 6 supplies a drive signal to the driving motor 4 through the driver 5 and controls the position of the lens 1 to the in-focus position. On the basis of the AE detection signal, the system controller 6 supplies a drive signal to the iris driving circuit 7 through the motor driver 8 and controls a gain of the AGC amplifier 10 through the D/A converter 11, thereby controlling the exposure. Further, on the basis of the AWB detection signal, the system controller 6 controls a level of each of the color signals and performs the white balance control.

The digital signal processing circuit 14 is constructed by a delay circuit, an adding/subtracting circuit, and the like. In the recording mode, the image pickup signal from the CCD image pickup device 1 is supplied to the digital signal processing circuit 14. The processing circuit 14 forms a luminance signal and a chroma signal from the image pickup signal. The luminance signal and the chroma signal from the processing circuit 14 are supplied to D/A converters 16 and 17, respectively, and are converted into analog signals. Outputs of the D/A converters 16 and 17 are taken out from output terminals 18 and 19, respectively.

In the reproducing mode, the reproduction composite color video signal from the input terminal 23 is supplied to the digital signal processing circuit 14. Upon reproduction, the processing circuit 14 operates as a comb filter. The digital signal processing circuit 14 separates the reproduction composite color video signal into the luminance signal and chroma signal. The luminance signal and the chroma signal from the processing circuit 14 are respectively supplied to the D/A converters 16 and 17 and are converted into analog signals. Outputs of the D/A converters 16 and 17 are taken out from the output terminals 18 and 19, respectively.

In the embodiment of the invention, by depressing an edit switch 21, the edit search mode is set. In the edit search mode, the values of the AF, AE, and AWB detection signals are held.

That is, as shown in a flowchart of FIG. 3, a check is made to see if the mode switch 20 has been set to the camera side or the VTR side (step 31).

When the mode switch 20 is set to the VTR side, the switching circuit 12 is switched to the terminal 12B side (step 32).

When the mode switch 20 is set to the camera side, the switching circuit 12 is switched to the terminal 12A side (step 33).

A check is made to see if the edit switch 21 has been depressed or not (step 34).

When the depression of the edit switch 21 is detected in step 34, the values of the AF, AE, and AWB detection signals of the optical detector 15 are held (step 35). The switching circuit 12 is switched to the terminal 12B side (step 36).

A check is made to see if the edit switch 21 is released or not (step 37). When the release of the edit switch 21 is detected in step 37, the processing routine is returned to step 33 and the switching circuit 12 is switched to the terminal 12A side.

As shown in step 35 in the flowchart of FIG. 3, according to the embodiment of the invention, the values of the AF, AE, and AWB detection signals of the optical detector 15 are held for a period of time when the edit switch 21 is depressed. Therefore, even just after the execution of the edit search, the values of the AF, AE, and AWB detection signals are not largely out of order and the optical characteristics just after the edit search are not out of order.

According to the embodiment of the invention, the values of the AF, AE, and AWB detection signals of the optical detector 15 are held for a period of time after the depression of the edit switch 21. However, it is also possible to provide a switching circuit on the input side of the optical detector and to shut off the input signal which is supplied to the optical detector for a period of time of the depression of the edit switch 21.

According to the invention, in the edit search mode, the state of the camera block is held, so that it is possible to prevent the optical characteristics of the camera just after the edit search from being out of order.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. Apparatus for controlling a video camera that includes a lens, an iris, and an automatic gain control, the apparatus comprising:

a switching circuit to which an image pickup signal from an image pickup device and a reproduction video signal are supplied to respective inputs and which selectively provides at an output either the image pickup signal from the image pickup device or the reproduction video signal;

an A/D converter to convert the output of the switching circuit into a digital signal;

a digital signal processing circuit for processing the digital signal from the A/D converter;

an optical information detecting circuit connected to the A/D converter to detect optical information and to produce output values representing optical characteristics of an output of the A/D converter;

an edit search mode switch; and a system controller connected to the edit search mode switch and the optical information detection circuit for controlling the lens, the iris, and the automatic gain control in response to the output values representing optical characteristics, and upon depressing the edit search mode switch, for holding the output values representing optical characteristics and then controlling the switching circuit to provide at the output the reproduction video signal, wherein upon releasing the edit search mode switch the output values being held are fed to control the lens, the iris, and the automatic gain control and the switching circuit is controlled to provide at the output the image pickup signal.

2. A video camera according to claim 1, wherein the optical information detecting circuit comprises a delay circuit and an adding/subtracting circuit and separates a luminance signal and a chroma signal from the image pickup signal in the recording mode and operates as a comb-shaped filter in the reproducing mode.

* * * * *